7039X
W. G. JOHNSTON.
MILL.
Patented May 3, 1832.
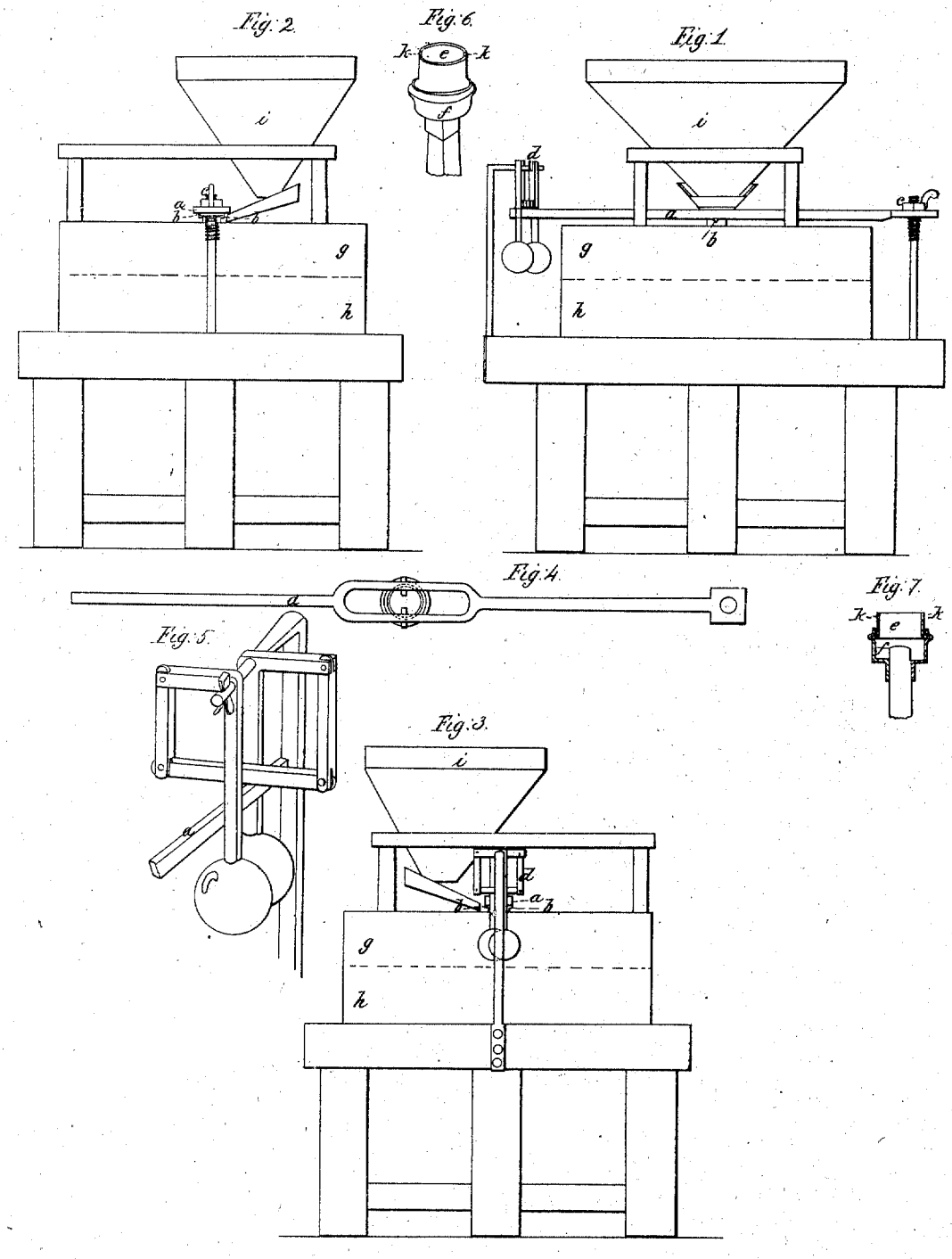

7039x    av. 10 May 3, 1832    20

William G. Johnston, Philadelphia Pa.

Letters Patent.

The Schedule referred to in these Letters Patent and making part of the same, containing a description in the words of the said William G. Johnston himself of his improvement in Mills for grinding wheat, Rye and other grain for flour, feed and other purposes, and for grinding paints, dye stuffs, plaster &c.

Be it known that I William G. Johnston of the City of Philadelphia, in the County of Philadelphia and State of Pennsylvania, have invented a new and useful improvement in Mills for grinding wheat, rye, and other grain for flour, feed and other purposes; and for grinding paints, dye stuffs, plaster &c. which is described as follows The Mill and gearings, with its fixtures may be constructed in the usual, or in any other convenient manner; excepting the apparatus for holding or pressing the stones together. The improvement relates solely to the plan of holding or pressing the upper stone (when that is the moving stone) down on the other or on the substance to be ground, when the stone is made so small that its specific gravity, or weight, is insufficient for that purpose; and when the lower stone is the moving stone, to the plan of raising, or pressing it up against the other or stationary one.—

The apparatus consists (when the upper stone is the moving stone) of the following parts, viz. a horizontal lever; a regulating screw; compound levers, and weights; a moveable and a fixed collar.

The Horizontal Lever is made of Iron or any suitable mamaterial and of a size adapted to the purpose intended about the length of the width of the frame of the mill and has an opening formed in its centre from one end to a little beyond the point where it rests on the collar hereafter described, being in the form of two parallel levers, or it may be formed in any convenient manner, so that ~~[illegible]~~ the lever may rest on the collar on each side of the spindle. The fulcrum or bearing point, of the lever is on its under side and is made in the form of two points, pivots, or spurs one on each arm of the lever, coming to a point or edge at the lower extremity where they rest upon the collar, so that the bearing shall be at the same point, whether the lever be in a horizontal position; or one end elevated, or depressed.

One end of the lever is held in its proper position at the end of the frame and regulated by a screw, wedge or in any convenient manner so as to be moved up or down in order to increase or diminish the effective power of the weights on the compound levers at its other end to be hereafter described. The regulating screw is made of a proper size and strength for the use intended, having a square head resting against the under side of one of the cross rails of the frame through which and the end of the lever it passes; with a nut on its other end by which the lever is regulated. The compound levers and weights are constructed in the following manner. There are two levers of the same dimensions each bent near one end, so that one part shall form an angle with the other of about 90°. These lines are placed in a perpendicular position with the end near which the bend is, placed up. and the convex sides placed towards each other with their fulcrums fixed at the angles, and attached to a spindle ~~[illegible]~~, which may be placed in the centre of the comcompound levers; or to a cross bar attached to said
Spindle; or to some other permanent object, in such
manner that the ends of the levers may move towards
& from each other. — There are three short bars attached
at the ends by Joints like hinges so that they will
bend at the Joints; one end of this connexion of
bars is attached to the upper end of one of the bent
levers, and the other end to the upper end of the other
bent lever, in such manner that the middle bar of
the three above mentioned is in a horizontal position,
and placed across the end of the above described hori-
zontal lever. A Ball or weight is attached to the [illegible]
lower end of each bent lever.

The moveable and fixed collars. A metallic
cylindrical collar is fixed permanently to the spindle.
Immediately above this and resting upon it is a move-
able collar so fixed, that the spindle may turn freely
within it having two small indentations on its upper
surface in which rests the points, pivots, or spurs
on the underside of the lever first described.

Operation

The mill being put in motion in the usual [illegible]
manner by water, steam or any convenient power, the
operation of the before described apparatus for holding
the stones together will be as follows.

When the upper stone is raised or lifted up [illegible]
from the other by any cause whatever, the balls or
weights are forced apart and raised, increasing their
effective weight or power, and when the upper stone settles
towards the other, the balls or weights settle and approach
each other by which their effective weight or power is
diminished; the apparatus resembling in construction
and operation the Governor of a steam engine, the effective
weight weight of the ball is also increased or diminished
by the operation of the regulating screw or wedge; depress
ing the end of the horizontal lever, thro' which the screw
passes when increased &c. raising it when decreased;
the former movement extending the balls or weights,
and the latter contracting them; the horizontal lever rest
=ing or bearing at or near its centre on the moveable collar
around the spindle on the points, pivots or spurs on its under
side. If the Mill be constructed with the lower stone to
turn and the upper one to remain permanent, the apparatus
for forcing the stones together is similar to that above
described, with this difference; that the permanent collar
on the spindle which turns the runner is placed above
the loose collar: and the horizontal lever rests on a fulcrum
fixed at or near its centre, with one end under the loose
collar, and the compound levers fixed at the other end.
Or instead of fixing the collars on the spindle as before
described the horizontal lever may be placed under the
oil box in which the lower end of the spindle turns.
or it may be fixed in any other convenient manner so that
the principle of regulating the runner by the compound
levers and weights be retained.
What I claim as my Invention and
desire to secure by Letters Patent is the mode of increas
=ing or diminishing the weight ~~[illegible]~~ of the runner by
a self regulating compound power so that fast and
good grinding may be performed with small stones
instead of large ones: thereby lessening the expense
in constructing Mills and so regulating the runner
as to prevent any danger of the Mill being choaked
or injured from hard substances getting between
the runner and bed stone as before described.
For a further illustration of my inventi[illegible]

7039x May 3, 1832

I refer to the Model and drawing of the same on deposited in the Patent Office.

In witness whereof I have hereunto subscribed my name this 28th day of April 1832.

Witnesses
William P. Elliot
William Webb

William G. Johnston 1210 rds